(12) United States Patent
Zavala Jurado et al.

(10) Patent No.: US 9,599,049 B2
(45) Date of Patent: Mar. 21, 2017

(54) ENGINE SPEED CONTROL SYSTEMS AND METHODS

(71) Applicant: GM Global Technology Operations LLC, Detroit, MI (US)

(72) Inventors: Jose C. Zavala Jurado, Ann Arbor, MI (US); Joshua D. Cowgill, Hartland, MI (US)

(73) Assignee: GM Global Technology Operations LLC, Detroit, MI (US)

(*) Notice: Subject to any disclaimer, the term of this patent is extended or adjusted under 35 U.S.C. 154(b) by 286 days.

(21) Appl. No.: 14/309,047

(22) Filed: Jun. 19, 2014

(65) Prior Publication Data

US 2015/0369146 A1  Dec. 24, 2015

(51) Int. Cl.
*F02D 41/02* (2006.01)
*F02D 41/10* (2006.01)
(Continued)

(52) U.S. Cl.
CPC ........ *F02D 41/0205* (2013.01); *F02D 11/105* (2013.01); *F02D 31/001* (2013.01); *F02D 41/0002* (2013.01); *F02D 41/10* (2013.01); *F02D 41/023* (2013.01); *F02D 2041/1412* (2013.01); *F02D 2041/1433* (2013.01); *F02D 2200/0402* (2013.01); *F02D 2200/0406* (2013.01); *F02D 2200/0408* (2013.01); *F02D 2250/18* (2013.01); *Y02T 10/42* (2013.01)

(58) Field of Classification Search
CPC ............. F02D 41/0205; F02D 41/0002; F02D 11/105; F02D 31/001; F02D 41/10
USPC ........................................................ 60/602
See application file for complete search history.

(56) References Cited

U.S. PATENT DOCUMENTS 4,161,929 A   7/1979  Nohira et al.
4,823,266 A * 4/1989  Baltusis ................ B60W 10/06
                                                477/110
(Continued)

FOREIGN PATENT DOCUMENTS

CN        1594846 A      3/2005
WO    WO-03-065135 A1    8/2003

OTHER PUBLICATIONS

U.S. Appl. No. 14/675,828, Apr. 1, 2015, Long et al.
(Continued)

*Primary Examiner* — Nicholas J Weiss
*Assistant Examiner* — Jason T Newton

(57) ABSTRACT

A target engine speed module selectively sets M target engine speeds for M future times, respectively, based on one of increasing and decreasing an engine speed. A prediction module, based on a set of possible target values for the M future times and a model of an engine, determines M predicted engine speeds for the M future times, respectively. A cost module determines a cost for the set of possible target values based on comparisons of the M predicted engine speeds for the M future times with the M target engine speeds for the M future times, respectively. A selection module, based on the cost, selects the set of possible target values from a group including the set of possible target values and N other sets of possible target values, and sets target values based on the selected set of possible target values. An actuator module controls an engine actuator based on a first one of the target values.

20 Claims, 4 Drawing Sheets

(51) Int. Cl.
*F02D 11/10* (2006.01)
*F02D 31/00* (2006.01)
*F02D 41/00* (2006.01)
*F02D 41/14* (2006.01)

(56) References Cited

U.S. PATENT DOCUMENTS

| | | |
|---|---|---|
| 5,070,846 A | 12/1991 | Dudek et al. |
| 5,101,786 A | 4/1992 | Kamio et al. |
| 5,268,835 A | 12/1993 | Miyagaki et al. |
| 5,270,935 A | 12/1993 | Dudek et al. |
| 5,293,553 A | 3/1994 | Dudek et al. |
| 5,347,446 A | 9/1994 | Iino et al. |
| 5,357,932 A | 10/1994 | Clinton et al. |
| 5,609,136 A | 3/1997 | Tuken |
| 5,706,780 A | 1/1998 | Shirakawa |
| 5,727,528 A | 3/1998 | Hori et al. |
| 5,775,293 A | 7/1998 | Kresse |
| 5,794,171 A | 8/1998 | Bryant et al. |
| 5,921,219 A | 7/1999 | Frohlich et al. |
| 6,014,955 A | 1/2000 | Hosotani et al. |
| 6,155,230 A | 12/2000 | Iwano et al. |
| 6,532,935 B2 | 3/2003 | Ganser et al. |
| 6,571,191 B1 | 5/2003 | York et al. |
| 6,606,981 B2 | 8/2003 | Itoyama |
| 6,619,261 B1* | 9/2003 | Wang ............... F02M 26/61 123/435 |
| 6,704,638 B2 | 3/2004 | Livshiz et al. |
| 6,714,852 B1 | 3/2004 | Lorenz et al. |
| 6,826,904 B2 | 12/2004 | Miura |
| 6,840,215 B1 | 1/2005 | Livshiz et al. |
| 6,928,362 B2 | 8/2005 | Meaney |
| 6,985,809 B2 | 1/2006 | Yasui |
| 7,016,779 B2 | 3/2006 | Bowyer |
| 7,021,282 B1 | 4/2006 | Livshiz et al. |
| 7,051,058 B2 | 5/2006 | Wagner et al. |
| 7,076,953 B2 | 7/2006 | Kreso |
| H2182 H | 2/2007 | Freel et al. |
| 7,225,782 B2 | 6/2007 | Pallett et al. |
| 7,274,986 B1 | 9/2007 | Petridis et al. |
| 7,275,374 B2 | 10/2007 | Stewart et al. |
| 7,328,577 B2 | 2/2008 | Stewart et al. |
| 7,395,147 B2 | 7/2008 | Livshiz et al. |
| 7,400,967 B2 | 7/2008 | Ueno et al. |
| 7,433,775 B2 | 10/2008 | Livshiz et al. |
| 7,441,544 B2 | 10/2008 | Hagari |
| 7,472,692 B2 | 1/2009 | Nakagawa et al. |
| 7,614,384 B2 | 11/2009 | Livshiz et al. |
| 7,650,225 B2 | 1/2010 | Nakagawa et al. |
| 7,703,439 B2 | 4/2010 | Russell et al. |
| 7,715,975 B2 | 5/2010 | Yamaoka et al. |
| 7,775,195 B2 | 8/2010 | Schondorf et al. |
| 7,783,409 B2 | 8/2010 | Kang et al. |
| 7,813,869 B2 | 10/2010 | Grichnik et al. |
| 7,885,756 B2 | 2/2011 | Livshiz et al. |
| 7,941,260 B2 | 5/2011 | Lee et al. |
| 7,967,720 B2 | 6/2011 | Martin et al. |
| 8,032,235 B2 | 10/2011 | Sayyar-Rodsari |
| 8,041,487 B2 | 10/2011 | Worthing et al. |
| 8,050,841 B2 | 11/2011 | Costin et al. |
| 8,073,610 B2 | 12/2011 | Heap et al. |
| 8,103,425 B2 | 1/2012 | Choi et al. |
| 8,103,428 B2 | 1/2012 | Russ et al. |
| 8,116,954 B2 | 2/2012 | Livshiz et al. |
| 8,176,735 B2 | 5/2012 | Komatsu |
| 8,255,139 B2 | 8/2012 | Whitney et al. |
| 8,265,854 B2 | 9/2012 | Stewart et al. |
| 8,307,814 B2 | 11/2012 | Leroy et al. |
| 8,360,040 B2* | 1/2013 | Stewart ............... F02D 31/007 123/672 |
| 8,447,492 B2 | 5/2013 | Watanabe et al. |
| 8,468,821 B2 | 6/2013 | Liu et al. |
| 8,483,935 B2 | 7/2013 | Whitney et al. |
| RE44,452 E* | 8/2013 | Stewart ............ F02D 41/0007 123/198 F |
| 8,560,204 B2 | 10/2013 | Simon, Jr. et al. |
| 8,739,766 B2 | 6/2014 | Jentz et al. |
| 8,760,003 B2 | 6/2014 | Imura et al. |
| 8,862,248 B2 | 10/2014 | Yasui |
| 8,954,257 B2 | 2/2015 | Livshiz et al. |
| 9,052,997 B2 | 6/2015 | Ono |
| 9,062,631 B2 | 6/2015 | Kinugawa et al. |
| 9,075,406 B2 | 7/2015 | Nakada |
| 9,127,614 B2 | 9/2015 | Ueno et al. |
| 9,145,841 B2 | 9/2015 | Miyazaki et al. |
| 9,175,628 B2 | 11/2015 | Livshiz et al. |
| 9,243,524 B2 | 1/2016 | Whitney et al. |
| 9,328,671 B2 | 5/2016 | Whitney et al. |
| 9,334,815 B2 | 5/2016 | Cygan, Jr. et al. |
| 9,399,959 B2 | 7/2016 | Whitney et al. |
| 2002/0038647 A1 | 4/2002 | Tashiro et al. |
| 2002/0078924 A1 | 6/2002 | Yagi |
| 2002/0128116 A1 | 9/2002 | Idogawa et al. |
| 2002/0179050 A1 | 12/2002 | Soliman et al. |
| 2003/0074892 A1 | 4/2003 | Miura |
| 2003/0110760 A1 | 6/2003 | Shirakawa |
| 2003/0145836 A1 | 8/2003 | Linna et al. |
| 2003/0177765 A1* | 9/2003 | Wang ............... F02B 37/24 60/602 |
| 2004/0116220 A1 | 6/2004 | Yamamoto et al. |
| 2005/0065691 A1 | 3/2005 | Cho |
| 2005/0131620 A1 | 6/2005 | Bowyer |
| 2005/0166900 A1 | 8/2005 | Song et al. |
| 2005/0171670 A1 | 8/2005 | Yoshioka et al. |
| 2005/0193739 A1 | 9/2005 | Brunell et al. |
| 2005/0204726 A1 | 9/2005 | Lewis |
| 2005/0228573 A1* | 10/2005 | Gangopadhyay ... F02D 41/0052 701/108 |
| 2005/0267608 A1 | 12/2005 | Nishira et al. |
| 2006/0113799 A1 | 6/2006 | Obayashi et al. |
| 2006/0137335 A1 | 6/2006 | Stewart et al. |
| 2006/0199699 A1 | 9/2006 | Berglund et al. |
| 2007/0068159 A1 | 3/2007 | Ueno et al. |
| 2007/0174003 A1 | 7/2007 | Ueno et al. |
| 2008/0120009 A1* | 5/2008 | Livshiz ............... F02D 11/105 701/102 |
| 2008/0127938 A1 | 6/2008 | Hagari |
| 2008/0271718 A1 | 11/2008 | Schondorf et al. |
| 2008/0308066 A1 | 12/2008 | Martin et al. |
| 2009/0018733 A1 | 1/2009 | Livshiz et al. |
| 2009/0033264 A1 | 2/2009 | Falkenstein |
| 2009/0037066 A1 | 2/2009 | Kuwahara et al. |
| 2009/0037073 A1 | 2/2009 | Jung et al. |
| 2009/0118968 A1 | 5/2009 | Livshiz et al. |
| 2009/0118969 A1 | 5/2009 | Heap et al. |
| 2009/0118972 A1 | 5/2009 | Baur et al. |
| 2009/0143959 A1 | 6/2009 | Yamaoka et al. |
| 2009/0229562 A1 | 9/2009 | Ramappan et al. |
| 2009/0292435 A1 | 11/2009 | Costin et al. |
| 2010/0049419 A1 | 2/2010 | Yoshikawa et al. |
| 2010/0057283 A1 | 3/2010 | Worthing et al. |
| 2010/0057329 A1 | 3/2010 | Livshiz et al. |
| 2010/0075803 A1 | 3/2010 | Sharples et al. |
| 2010/0116249 A1 | 5/2010 | Guerrassi et al. |
| 2010/0116250 A1 | 5/2010 | Simon, Jr. et al. |
| 2010/0180876 A1 | 7/2010 | Leroy et al. |
| 2010/0211294 A1 | 8/2010 | Soejima |
| 2010/0222982 A1 | 9/2010 | Wang et al. |
| 2010/0241335 A1 | 9/2010 | Aso |
| 2010/0263627 A1 | 10/2010 | Whitney et al. |
| 2010/0268436 A1 | 10/2010 | Soejima et al. |
| 2010/0280738 A1 | 11/2010 | Whitney et al. |
| 2011/0034298 A1 | 2/2011 | Doering et al. |
| 2011/0045948 A1 | 2/2011 | Doering et al. |
| 2011/0066308 A1 | 3/2011 | Yang et al. |
| 2011/0082629 A1 | 4/2011 | Soejima et al. |
| 2011/0087421 A1 | 4/2011 | Soejima et al. |
| 2011/0100013 A1 | 5/2011 | Whitney et al. |
| 2011/0113773 A1 | 5/2011 | Liu et al. |
| 2011/0125390 A1 | 5/2011 | Bellinger et al. |
| 2011/0144838 A1 | 6/2011 | Matthews et al. |
| 2011/0264353 A1 | 10/2011 | Atkinson et al. |
| 2012/0065864 A1 | 3/2012 | Whitney et al. |
| 2012/0150399 A1 | 6/2012 | Kar et al. |

(56) References Cited

U.S. PATENT DOCUMENTS

| | | |
|---|---|---|
| 2012/0203434 A1 | 8/2012 | Sujan et al. |
| 2012/0209493 A1 | 8/2012 | Miyata et al. |
| 2012/0296557 A1 | 11/2012 | Ramappan et al. |
| 2013/0032123 A1 | 2/2013 | Kinugawa et al. |
| 2013/0032127 A1 | 2/2013 | Jentz et al. |
| 2013/0060448 A1 | 3/2013 | Nakada |
| 2013/0080023 A1 | 3/2013 | Livshiz et al. |
| 2013/0104859 A1 | 5/2013 | Miyazaki et al. |
| 2013/0151124 A1 | 6/2013 | Seiberlich et al. |
| 2013/0184961 A1 | 7/2013 | Kumar et al. |
| 2013/0213353 A1 | 8/2013 | Rollinger et al. |
| 2013/0255625 A1 | 10/2013 | Kar et al. |
| 2014/0076279 A1 | 3/2014 | Livshiz et al. |
| 2014/0123938 A1 | 5/2014 | Whitney et al. |
| 2014/0174413 A1 | 6/2014 | Huang et al. |
| 2014/0174414 A1 | 6/2014 | Huang et al. |
| 2014/0311446 A1 | 10/2014 | Whitney et al. |
| 2014/0316681 A1 | 10/2014 | Whitney et al. |
| 2014/0316682 A1 | 10/2014 | Whitney et al. |
| 2014/0316683 A1 | 10/2014 | Whitney et al. |
| 2015/0039206 A1 | 2/2015 | Storch et al. |
| 2015/0275569 A1 | 10/2015 | LeBlanc |
| 2015/0275711 A1 | 10/2015 | Whitney et al. |
| 2015/0275771 A1 | 10/2015 | Pochner et al. |
| 2015/0275772 A1 | 10/2015 | Long et al. |
| 2015/0275783 A1 | 10/2015 | Wong et al. |
| 2015/0275784 A1 | 10/2015 | Whitney et al. |
| 2015/0275785 A1 | 10/2015 | Cygan, Jr. et al. |
| 2015/0275786 A1 | 10/2015 | Jin et al. |
| 2015/0275789 A1 | 10/2015 | Cygan, Jr. et al. |
| 2015/0275792 A1 | 10/2015 | Genslak et al. |
| 2015/0275794 A1 | 10/2015 | Verdejo et al. |
| 2015/0275795 A1 | 10/2015 | Cygan, Jr. et al. |
| 2015/0275796 A1 | 10/2015 | Pochner et al. |
| 2015/0275806 A1 | 10/2015 | Genslak et al. |
| 2015/0361915 A1* | 12/2015 | Sujan .................. F02D 9/02 701/54 |
| 2015/0369146 A1 | 12/2015 | Zavala Jurado et al. |
| 2016/0237932 A1 | 8/2016 | Long et al. |

OTHER PUBLICATIONS

U.S. Appl. No 14/675,860, Apr. 2001, Long et al.
John C. G. Boot; "Quadratic Programming: Algorithms, Anomalies, Applications Volume 2 of Studies in mathematical and managerial economics"; North-Holland Publ.Comp., 1964; 213 pages.
N. Lawrence Ricker; "Use of quadratic programming for constrained internal model control"; Ind. Eng. Chem. Process Des. Dev., 1985, pp. 925-936.
C. E. Lemke; "A Method of Solution for Quadratic Programs"; Rensselaer Polytechnic Institute, Troy, New York, Published Online: Jul. 1, 1962, pp. 442-453.
U.S. Appl. No. 13/613,588, Sep. 13, 2012, Livshiz et al.
U.S. Appl. No. 13/613,683, Sep. 13, 2012, Livshiz et al.
U.S. Appl. No. 13/686,069, Nov. 27, 2012, Livshiz et al.
U.S. Appl. No. 13/911,121, Jun. 6, 2013, Whitney et al.
U.S. Appl. No. 13/911,132, Jun. 6, 2013, Whitney et al.
U.S. Appl. No. 13/911,148, Jun. 6, 2013, Whitney et al.
U.S. Appl. No. 13/911,156, Jun. 6, 2013, Whitney et al.
U.S. Appl. No. 14/032,508, Sep. 20, 2013, Storch et al.
U.S. Appl. No. 14/225,492, Mar. 26, 2014, Wong et al.
U.S. Appl. No. 14/225,496, Mar. 26, 2014, Pochner et al.
U.S. Appl. No. 14/225,502, Mar. 26, 2014, Long et al.
U.S. Appl. No. 14/225,507, Mar. 26, 2014, Jin et al.
U.S. Appl. No. 14/225,516, Mar. 26, 2014, Whitney et al.
U.S. Appl. No. 14/225,531, Mar. 26, 2014, Genslak et al.
U.S. Appl. No. 14/225,569, Mar. 26, 2014, Long et al.
U.S. Appl. No. 14/225,587, Mar. 26, 2014, Cygan Jr. et al.
U.S. Appl. No. 14/225,626, Mar. 26, 2014, Verdejo et al.
U.S. Appl. No. 14/225,808, Mar. 26, 2014, Whitney et al.
U.S. Appl. No. 14/225,817, Mar. 26, 2014, Cygan Jr. et al.
U.S. Appl. No. 14/225,891, Mar. 26, 2014, Genslak et al.
U.S. Appl. No. 14/225,896, Mar. 26, 2014, Cygan Jr. et al.
U.S. Appl. No. 14/226,006, Mar. 26, 2014, Pochner et al.
U.S. Appl. No. 14/226,121, Mar. 26, 2014, Wong et al.
Kolmanovsky, I., "Towards Engine and Powertrain Control Based on Model Predictive Control," (Sep. 28, 2012), Powerpoint Presentation, 47 slides.
U.S. Appl. No. 14/617,068, Feb. 9, 2015, Whitney et al.
U.S. Appl. No. 14/931,134, Nov. 3, 2015, Wong et al.
U.S. Appl. No. 15/181,559, Jun. 14, 2016, Shifang Li et al.
Y. Tian ; Department of Aerospace Engineering, the University of Michigan, Ann Arbor, United States; S. Li ; Y. -Y. Wang ; I. V. Kolmanovsky; "Risk prediction and its use for control of constrained systems with disturbances", Published in 2015; American Control Conference (ACC); Chicago, IL USA; Jul. 1-3, 2015; pp. 2987-2992.

* cited by examiner

ENGINE SPEED CONTROL SYSTEMS AND METHODS

FIELD

The present disclosure relates to internal combustion engines and more particularly to engine control systems and methods for vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

In a feature, an engine control system of a vehicle is disclosed. A target engine speed module selectively sets M target engine speeds for M future times, respectively, based on one of increasing and decreasing an engine speed. M is an integer greater than one. A prediction module, based on a set of possible target values for the M future times and a model of an engine, determines M predicted engine speeds for the M future times, respectively. A cost module determines a cost for the set of possible target values based on comparisons of the M predicted engine speeds for the M future times with the M target engine speeds for the M future times, respectively. A selection module, based on the cost, selects the set of possible target values from a group including the set of possible target values and N other sets of possible target values, wherein N is an integer greater than zero, and sets target values based on the selected set of possible target values. An actuator module controls an engine actuator based on a first one of the target values.

In further features: based on the set of possible target values and the model of the engine, the prediction module further determines M predicted intake manifold pressures for the M future times, respectively; and the cost module determines the cost for the set of possible target values further based on comparisons of the M predicted intake manifold pressures with M intake manifold pressure ranges for the M future times, respectively.

In still further features, a constraint module that determines the M intake manifold pressure ranges for the M future times based on minimum and maximum air per cylinders (APCs) of the engine and at least one engine speed.

In yet further features: based on the set of possible target values and the model of the engine, the prediction module further determines M predicted torque outputs of the engine for the M future times, respectively; and the cost module determines the cost for the set of possible target values further based on comparisons of the M predicted torques with M engine torque output ranges for the M future times, respectively.

In further features, a constraint module that determines the M engine torque output ranges for the M future times based on M intake manifold pressure ranges for the M future times, respectively, and at least one engine speed.

In still further features: based on the set of possible target values and the model of the engine, the prediction module further determines M predicted intake manifold pressures for the M future times, respectively; and the cost module determines the cost for the set of possible target values further based on comparisons of the M predicted intake manifold pressures with the M intake manifold pressure ranges for the M future times, respectively.

In yet further features, the target engine speed module sets the M target engine speeds for the M future times, respectively, based on increasing the engine speed for a downshift of a transmission.

In further features, the target engine speed module sets the M target engine speeds for the M future times, respectively, based on decreasing the engine speed for an upshift of a transmission.

In still further features, the selection module selects the set of possible target values from the group based on the cost being less than costs of the N other sets of possible target values, respectively.

In yet further features: a boost actuator module that controls opening of a wastegate of a turbocharger based on a second one of the target values; an exhaust gas recirculation (EGR) actuator module that controls opening of an EGR valve based on a third one of the target values; a phaser actuator module that controls intake and exhaust valve phasing based on fourth and fifth ones of the target values, respectively; a spark actuator module that controls spark timing based on a sixth one of the target values; and a fuel actuator module that controls fueling based on a seventh one of the target values. The actuator module controls the opening of a throttle valve based on the one of the target values.

In a feature, an engine control method for a vehicle is disclosed. The engine control method includes: selectively setting M target engine speeds for M future times, respectively, based on one of increasing and decreasing an engine speed, wherein M is an integer greater than one; based on a set of possible target values for the M future times and a model of an engine, determining M predicted engine speeds for the M future times, respectively; determining a cost for the set of possible target values based on comparisons of the M predicted engine speeds for the M future times with the M target engine speeds for the M future times, respectively;

based on the cost, selecting the set of possible target values from a group including the set of possible target values and N other sets of possible target values, wherein N is an integer greater than zero; setting target values based on the selected set of possible target values; and controlling an engine actuator based on a first one of the target values.

In further features, the engine control method further includes: based on the set of possible target values and the model of the engine, determining M predicted intake manifold pressures for the M future times, respectively; and determining the cost for the set of possible target values further based on comparisons of the M predicted intake manifold pressures with M intake manifold pressure ranges for the M future times, respectively.

In still further features, the engine control method further includes determining the M intake manifold pressure ranges for the M future times based on minimum and maximum air per cylinders (APCs) of the engine and at least one engine speed.

In yet further features, the engine control method further includes: based on the set of possible target values and the model of the engine, determining M predicted torque outputs of the engine for the M future times, respectively; and determining the cost for the set of possible target values further based on comparisons of the M predicted torques with M engine torque output ranges for the M future times, respectively.

In further features, the engine control method further includes determining the M engine torque output ranges for the M future times based on M intake manifold pressure ranges for the M future times, respectively, and at least one engine speed.

In still further features, the engine control method further includes: based on the set of possible target values and the model of the engine, determining M predicted intake manifold pressures for the M future times, respectively; and determining the cost for the set of possible target values further based on comparisons of the M predicted intake manifold pressures with the M intake manifold pressure ranges for the M future times, respectively.

In yet further features, the engine control method further includes setting the M target engine speeds for the M future times, respectively, based on increasing the engine speed for a downshift of a transmission.

In further features, the engine control method further includes setting the M target engine speeds for the M future times, respectively, based on decreasing the engine speed for an upshift of a transmission.

In still further features, the engine control method further includes selecting the set of possible target values from the group based on the cost being less than costs of the N other sets of possible target values, respectively.

In yet further features, the engine control method further includes: controlling opening of a wastegate of a turbocharger based on a second one of the target values; controlling opening of an exhaust gas recirculation (EGR) valve based on a third one of the target values; controlling intake and exhaust valve phasing based on fourth and fifth ones of the target values, respectively; controlling spark timing based on a sixth one of the target values; and controlling fueling based on a seventh one of the target values, wherein controlling the engine actuator based on the first one of the target values includes controlling opening of a throttle valve based on the first one of the target values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control module (ECM) controls torque output of an engine. More specifically, the ECM controls actuators of the engine based on target values, respectively, selected based on a requested amount of torque. For example, the ECM controls intake and exhaust camshaft phasing based on target intake and exhaust phaser angles, a throttle valve based on a target throttle opening, an exhaust gas recirculation (EGR) valve based on a target EGR opening, and a wastegate of a turbocharger based on a target wastegate duty cycle. The ECM also controls spark timing based on a target spark timing and fueling based on target fueling parameters.

The ECM could determine the target values individually using multiple single input single output (SISO) controllers, such as proportional integral derivative (PID) controllers. However, when multiple SISO controllers are used, the target values may be set to maintain system stability at the expense of possible fuel consumption decreases. Additionally, calibration and design of the individual SISO controllers may be costly and time consuming.

The ECM of the present disclosure identifies possible sets of target values. The ECM determines predicted parameters for each of the possible sets based on the possible sets' target values and a mathematical model of the engine. For example, the ECM may determine predicted engine torques, predicted engine speeds, predicted manifold pressures, and one or more other predicted parameters for each of the possible sets of target values.

The ECM may also determine a cost associated with use of each of the possible sets. For example, the cost of a possible set that is predicted to more closely track an engine torque request may be lower than other possible sets that are not expected to track the engine torque request as closely. The ECM may select a possible set that has the lowest cost as to track the engine torque request as closely as possible.

Under some circumstances, changes in engine speed may be anticipated in advance of the change actually occurring. For example, changes in the engine speed may be anticipated when a gear shift will be performed and under other circumstances. For example, the engine speed may increase for a downshift of a transmission and may decrease for an upshift of the transmission.

According to the present disclosure, the costs are determined further based on a target engine speed trajectory. The ECM will therefore select a possible set that enables the engine to achieve the torque request and tracks the target engine speed trajectory. This allows the engine to more smoothly accomplish engine speed changes.

Figure 1:
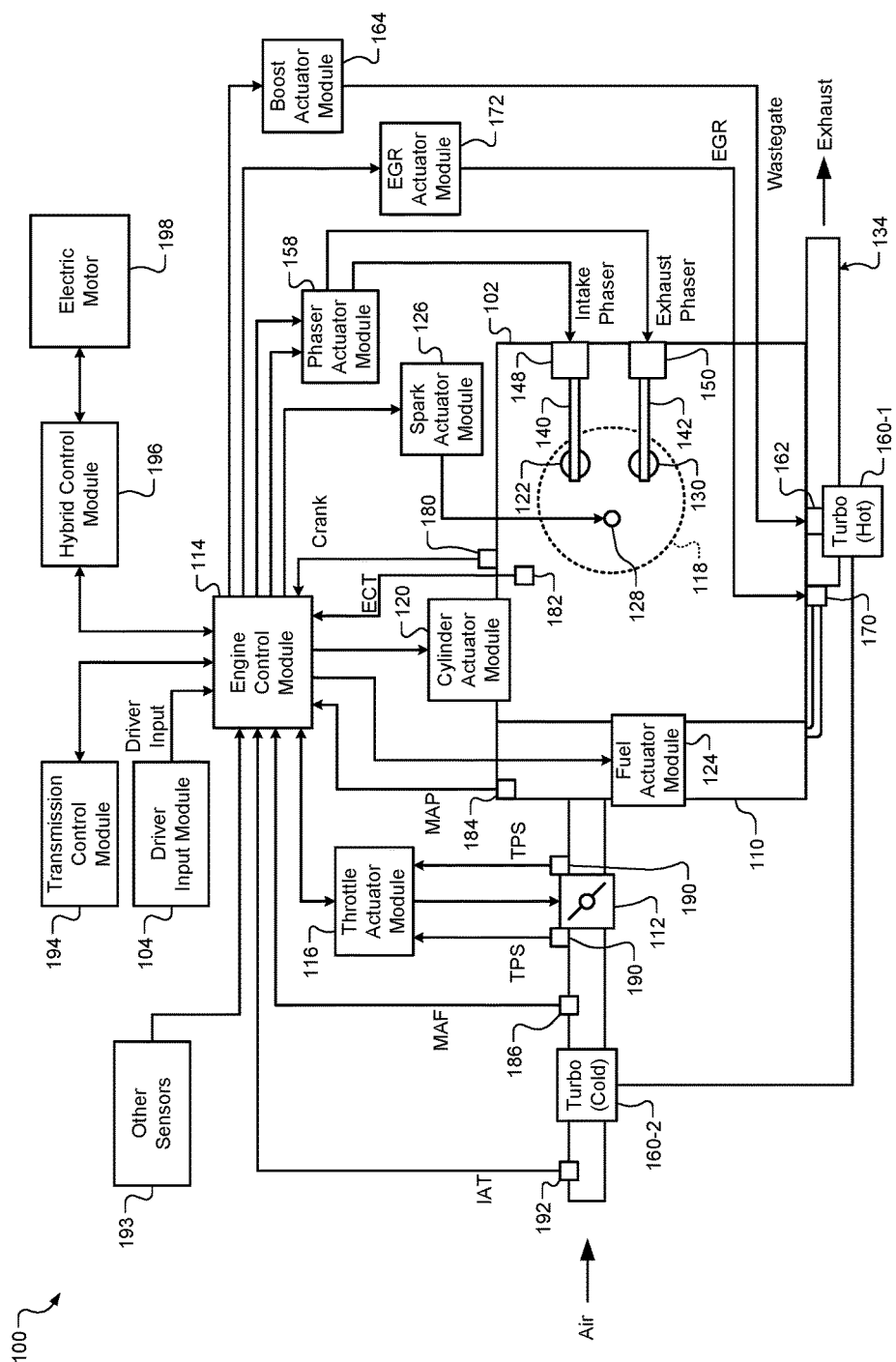
FIG. 1 is a functional block diagram of an example engine system according to the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
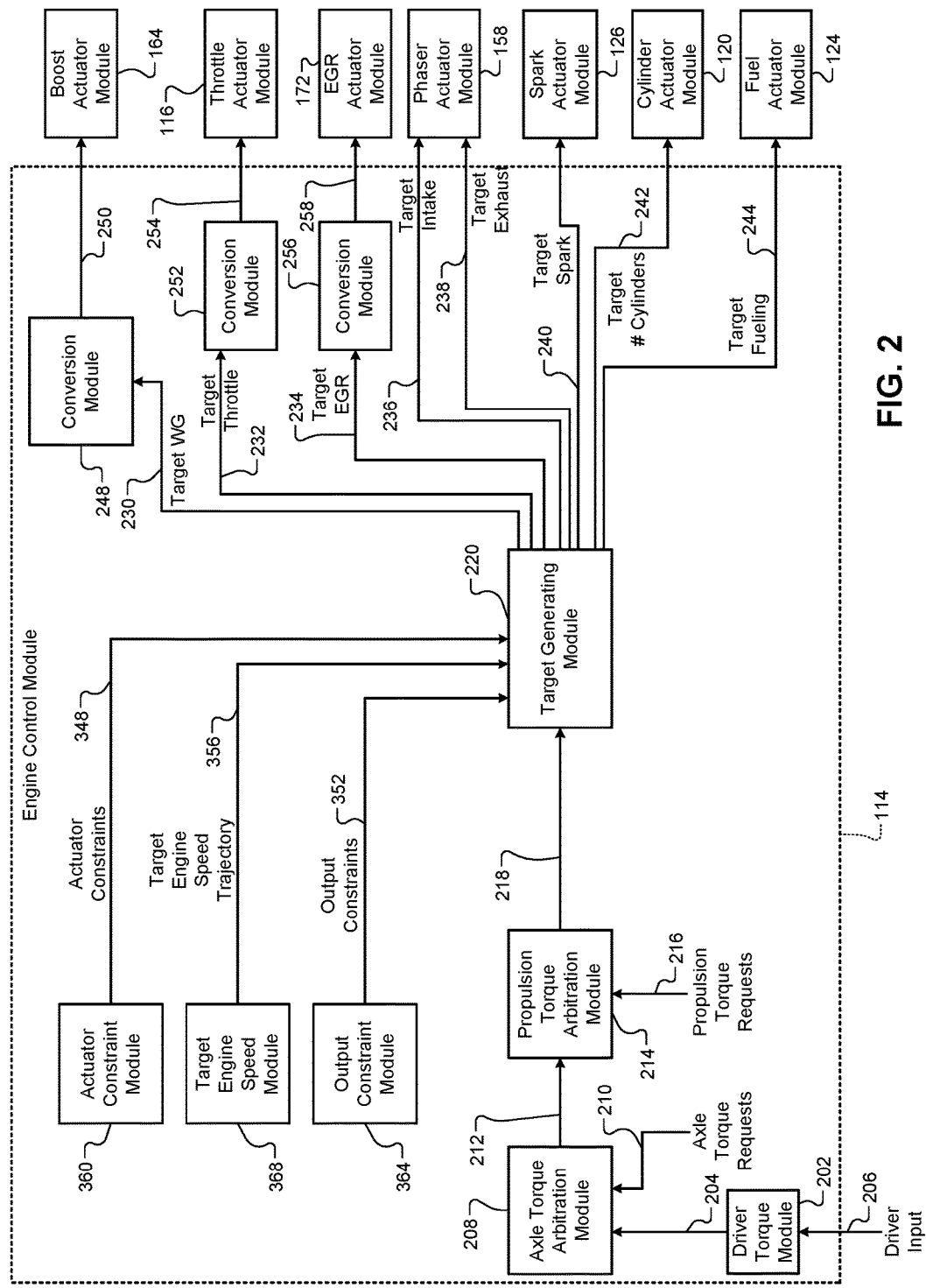
FIG. 2 is a functional block diagram of an example engine control system according to the present disclosure.

Referring now to FIG. 2, a functional block diagram of an example engine control system is presented. A driver torque module 202 determines a driver torque request 204 based on a driver input 206 from the driver input module 104. The driver input 206 may be based on, for example, a position of an accelerator pedal and a position of a brake pedal. The driver input 206 may also be based on cruise control, which may be an adaptive cruise control system that varies vehicle speed to maintain a predetermined following distance. The driver torque module 202 may store one or more mappings of accelerator pedal position to target torque and may determine the driver torque request 204 based on a selected one of the mappings. The driver torque module 202 may also apply one or more filters to rate limit changes in the driver torque request 204.

An axle torque arbitration module 208 arbitrates between the driver torque request 204 and other axle torque requests 210. Axle torque (torque at the wheels) may be produced by various sources including an engine and/or an electric motor. For example, the axle torque requests 210 may include a torque reduction requested by a traction control system when positive wheel slip is detected. Positive wheel slip occurs when axle torque overcomes friction between the wheels and the road surface, and the wheels begin to slip against the road surface. The axle torque requests 210 may also include a torque increase request to counteract negative wheel slip, where a tire of the vehicle slips in the other direction with respect to the road surface because the axle torque is negative.

The axle torque requests 210 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 210 may also be generated by vehicle stability control systems.

The axle torque arbitration module 208 outputs an axle torque request 212 based on the results of arbitrating between the received axle torque requests 204 and 210. As described below, the axle torque request 212 from the axle torque arbitration module 208 may selectively be adjusted by other modules of the ECM 114 before being used to control the engine actuators.

The axle torque arbitration module 208 may output the axle torque request 212 to a propulsion torque arbitration module 214. In various implementations, the axle torque arbitration module 208 may output the axle torque request 212 to a hybrid optimization module (not shown). The hybrid optimization module may determine how much torque should be produced by the engine 102 and how much torque should be produced by the electric motor 198. The hybrid optimization module then outputs a modified torque request to the propulsion torque arbitration module 214.

The propulsion torque arbitration module 214 converts the axle torque request 212 from an axle torque domain (torque at the wheels) into a propulsion torque domain (torque at the crankshaft). The propulsion torque arbitration module 214 arbitrates between the (converted) axle torque request 212 and other propulsion torque requests 216. The propulsion torque arbitration module 214 generates a propulsion torque request 218 as a result of the arbitration.

For example, the propulsion torque requests 216 may include torque reductions for engine over-speed protection, torque increases for stall prevention, and torque reductions requested by the transmission control module 194 to accommodate gear shifts. The propulsion torque requests 216 may also result from clutch fuel cutoff, which reduces the engine output torque when the driver depresses the clutch pedal in a manual transmission vehicle to prevent a flare in engine speed.

The propulsion torque requests 216 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 214 may output zero as the propulsion torque request 218.

In various implementations, an engine shutoff request may simply shut down the engine 102 separately from the arbitration process. The propulsion torque arbitration module 214 may still receive the engine shutoff request so that, for example, appropriate data can be fed back to other torque requestors. For example, all other torque requestors may be informed that they have lost arbitration.

A target generating module 220 (see also FIG. 3) generates target values for the engine actuators based on the propulsion torque request 218 and other parameters as discussed further below. The target generating module 220 generates the target values using model predictive control (MPC). The propulsion torque request 218 may be a brake torque. Brake torque may refer to torque at the crankshaft under the current operating conditions.

The target values include a target wastegate opening area 230, a target throttle opening area 232, a target EGR opening area 234, a target intake cam phaser angle 236, and a target exhaust cam phaser angle 238. The target values also include a target spark timing 240, a target number of cylinders to be activated 242, and target fueling parameters 244. The boost actuator module 164 controls the wastegate 162 to achieve the target wastegate opening area 230. For example, a first conversion module 248 may convert the target wastegate opening area 230 into a target duty cycle 250 to be applied to the wastegate 162, and the boost actuator module 164 may apply a signal to the wastegate 162 based on the target duty cycle 250. In various implementations, the first conversion module 248 may convert the target wastegate opening area 230 into a target wastegate position (not shown), and convert the target wastegate position into the target duty cycle 250.

The throttle actuator module 116 controls the throttle valve 112 to achieve the target throttle opening area 232. For example, a second conversion module 252 may convert the target throttle opening area 232 into a target duty cycle 254 to be applied to the throttle valve 112, and the throttle actuator module 116 may apply a signal to the throttle valve 112 based on the target duty cycle 254. In various implementations, the second conversion module 252 may convert the target throttle opening area 232 into a target throttle position (not shown), and convert the target throttle position into the target duty cycle 254.

The EGR actuator module 172 controls the EGR valve 170 to achieve the target EGR opening area 234. For example, a third conversion module 256 may convert the target EGR opening area 234 into a target duty cycle 258 to be applied to the EGR valve 170, and the EGR actuator module 172 may apply a signal to the EGR valve 170 based on the target duty cycle 258. In various implementations, the third conversion module 256 may convert the target EGR opening area 234 into a target EGR position (not shown), and convert the target EGR position into the target duty cycle 258.

The phaser actuator module 158 controls the intake cam phaser 148 to achieve the target intake cam phaser angle 236. The phaser actuator module 158 also controls the exhaust cam phaser 150 to achieve the target exhaust cam phaser angle 238. In various implementations, a fourth conversion module (not shown) may be included and may convert the target intake and exhaust cam phaser angles 236 and 238 into target intake and exhaust duty cycles, respectively. The phaser actuator module 158 may apply the target intake and exhaust duty cycles to the intake and exhaust cam phasers 148 and 150, respectively. In various implementations, the target generating module 220 may determine a target valve overlap factor and a target effective displacement, and the phaser actuator module 158 may control the intake and exhaust cam phasers 148 and 150 to achieve the target overlap factor and the target effective displacement.

The spark actuator module 126 provides spark based on the target spark timing 240. In various implementations, the target generating module 220 may generate a target combustion phasing value, such as a target crankshaft angle where 50 percent of a provided mass of fuel will be burned (CA50). The target spark timing may be determined based on the target combustion phasing value and an estimated burn duration. The estimated burn duration may be determined, for example, based on APC, humidity, dilution, and temperature of air within a cylinder. Alternatively, the target generating module 220 may determine a target torque decrease, and the target spark timing 240 may be determined based on how far to retard the spark timing relative to an optimal spark timing to achieve the target torque decrease.

The cylinder actuator module 120 selectively activates and deactivates the valves of cylinders based on the target number of cylinders 242. Fueling and spark may also be disabled to cylinders that are deactivated. The target fueling parameters 244 may include, for example, target mass of fuel, target injection starting timing, and target number of fuel injections. The fuel actuator module 124 controls fueling based on the target fueling parameters 244.

Figure 3:
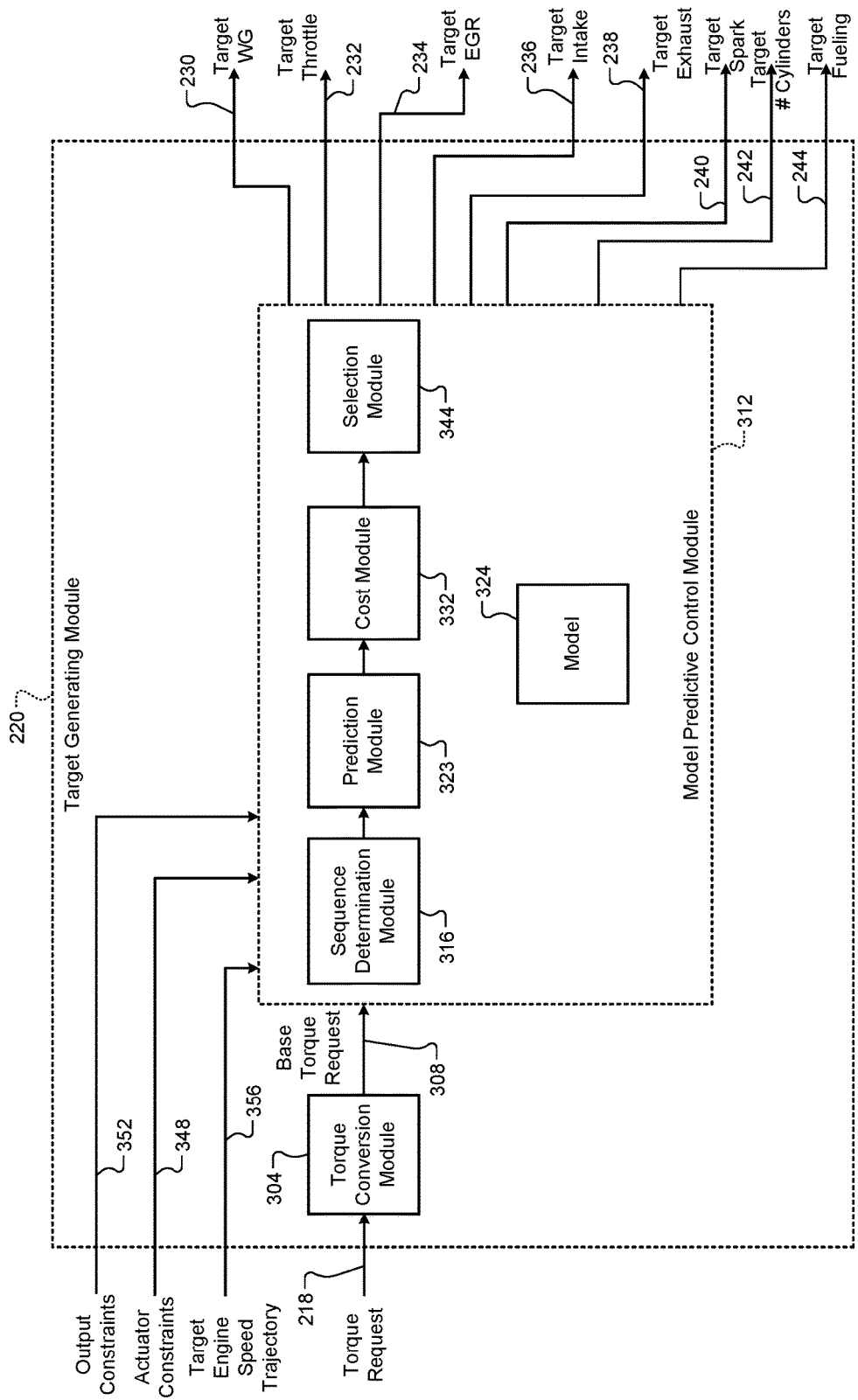
FIG. 3 is a functional block diagram of an example target generating module according to the present disclosure.

FIG. 3 is a functional block diagram of an example implementation of the target generating module 220. Referring now to FIGS. 2 and 3, as discussed above, the propulsion torque request 218 may be a brake torque. A torque conversion module 304 converts the propulsion torque request 218 from brake torque into base torque. The torque request resulting from conversion into base torque will be referred to as a base torque request 308.

Base torques may refer to torque at the crankshaft made during operation of the engine 102 on a dynamometer while the engine 102 is warm and no torque loads are imposed on the engine 102 by accessories, such as an alternator and the NC compressor. The torque conversion module 304 may convert the propulsion torque request 218 into the base torque request 308, for example, using a mapping or a function that relates brake torques to base torques. In various implementations, the torque conversion module 304 may convert the propulsion torque request 218 into another suitable type of torque, such as an indicated torque. An indicated torque may refer to a torque at the crankshaft attributable to work produced via combustion within the cylinders.

An MPC (model predictive control) module 312 generates the target values 230-244 using MPC. The MPC module 312 may be a single module or may comprise multiple modules. For example, the MPC module 312 may include a sequence determination module 316. The sequence determination module 316 determines possible sequences of the target values 230-244 that could be used together during N future control loops.

Each of the possible sequences identified by the sequence determination module 316 includes one sequence of N values for each of the target values 230-244. In other words, each possible sequence includes a sequence of N values for the target wastegate opening area 230, a sequence of N values for the target throttle opening area 232, a sequence of N values for the target EGR opening area 234, a sequence of N values for the target intake cam phaser angle 236, and a sequence of N values for the target exhaust cam phaser angle 238. Each possible sequence also includes a sequence of N values for the target spark timing 240, the target number of cylinders 242, and the target fueling parameters 244. Each of the N values are for a corresponding one of the N future control loops. N is an integer greater than one. The period of time defined by the N future control loops may be referred to as a control horizon.

A prediction module 323 determines predicted responses of the engine 102 to the possible sequences of the target values 230-244, respectively, based on a mathematical model 324 of the engine 102. For example, based on a possible sequence of the target values 230-244, using the model 324, the prediction module 323 generates a sequence of M predicted torques of the engine 102 for M of the N future control loops, a sequence of M predicted engine speeds for the M future control loops, and a sequence of M predicted MAPs for the M future control loops. While an example of generating predicted torque, predicted engine speed, and predicted MAP is described, the predicted parameters may include one or more other predicted operating parameters. The period of time defined by the M future control loops may be referred to as a prediction horizon. M is an integer that is greater than or equal to N. As such, the prediction horizon is greater than or equal to the control horizon. The model 324 may include, for example, a function or a mapping calibrated based on characteristics of the engine 102.

The prediction module 323 may generate the predicted parameters for a given sequence of possible target values based on the relationships:

$$x(k+1) = Ax(k) + Bu(k); \text{ and}$$

$$y(k) = Cx(k),$$

where $x(k+1)$ is a vector with entries indicative of states of the engine 102 for a next control loop k+1, A is a matrix including constant values calibrated based on characteristics of the engine 102, $x(k)$ is a vector with entries indicative of states of the engine 102 for the k-th control loop, B is a matrix including constant values calibrated based on characteristics of the engine 102, $u(k)$ is a vector of including entries for the possible target values for the k-th control loop, $y(k)$ is a vector including the predicted parameters for the k-th control loop, and C is a matrix including constant values calibrated based on characteristics of the engine 102. The vector $x(k+1)$ determined during for the k-th control loop will be used as the vector $x(k)$ for the next control loop k+1. The prediction module 323 generates the predicted parameters for each of M of the N future control loops, where M is an integer that is greater than zero and greater than or equal to N (i.e., k=0, 1, . . . M). The relationships can also be written as:

$$x(k) = Ax(k-1) + Bu(k-1); \text{ and}$$

$$y(k) = Cx(k),$$

where k is a control loop, $x(k-1)$ is a vector with entries indicative of states of the engine 102 for a last control loop, A is a matrix including constant values calibrated based on characteristics of the engine 102, $x(k)$ is a vector with entries indicative of states of the engine 102 for the k-th control loop, B is a matrix including constant values calibrated based on characteristics of the engine 102, $u(k-1)$ is a vector of including entries for the possible target values for the last control loop k-1.

How the components of the above relationships can be re-written for the example of the predicted parameters including predicted torque, predicted engine speed, and predicted MAP will now be described. The vector $x(k+1)$ can be re-written as:

$$x(k+1) = \begin{bmatrix} x1(k+1) \\ x2(k+1) \\ x3(k+1) \end{bmatrix},$$

where $x1(k+1)$ is a first state parameter of the engine 102 for the next control loop, $x2(k+1)$ is a second state parameter of the engine 102 for the next control loop, and $x3(k+1)$ is a third state parameter of the engine 102 for the next control loop.

The matrix A can be re-written as:

$$A = \begin{bmatrix} a11 & a12 & a13 \\ a21 & a22 & a23 \\ a31 & a32 & a33 \end{bmatrix}$$

where a111-a33 are constant values calibrated based on characteristics of the engine 102.

The vector $x(k)$ can be re-written as:

$$x(k) = \begin{bmatrix} x1(k) \\ x2(k) \\ x3(k) \end{bmatrix},$$

where $x1(k)$ is the first state parameter of the engine 102 for the k-th control loop, $x2(k)$ is the second state parameter of the engine 102 for the k-th control loop, and $x3(k)$ is the third state parameter of the engine 102 for k-th control loop. The entries of the vector $x(k)$ are the entries of the vector $x(k+1)$ calculated for the last control loop. The entries of the vector $x(k+1)$ calculated for the k-th control loop are used for the next control loop as the entries of vector $x(k)$.

The matrix B can be re-written as:

$$B = \begin{bmatrix} b11 & b12 & b13 & b14 & b15 & b16 & b17 & b18 \\ b21 & b22 & b23 & b24 & b25 & b26 & b27 & b28 \\ b31 & b32 & b33 & b34 & b35 & b36 & b37 & b38 \end{bmatrix}$$

where b11-b38 are constant values calibrated based on characteristics of the engine 102.

The vector u(k) can be re-written as:

$$u(k) = \begin{bmatrix} PTT(k) \\ PTWG(k) \\ PTEGR(k) \\ PTICP(k) \\ PTECP(k) \\ PTS(k) \\ PTN(k) \\ PTF(k) \end{bmatrix},$$

where PTT(k) is a possible target throttle opening of a possible sequence for the k-th control loop, PTWG(k) is a possible target wastegate opening of the possible sequence for the k-th control loop, PTEGR(k) is a possible target EGR opening of the possible sequence for the k-th control loop, PTICP(k) is a possible target intake cam phasing value of the possible sequence for the k-th control loop, and PTECP(k) is a possible target exhaust cam phasing value of the possible sequence for the k-th control loop. PTS(k) is a possible target spark timing for the k-th control loop, PTN(k) is a possible number of cylinders for the k-th control loop, and PTF(k) includes possible fueling parameters for the k-th control loop.

The vector y(k) can be re-written as:

$$y(k) = \begin{bmatrix} PT(k) \\ PRPM(k) \\ PMAP(k) \end{bmatrix},$$

where PT(k) is a predicted torque of the engine 102 for the k-th control loop, PRPM(k) is a predicted engine speed for the k-th control loop, and PMAP(k) is a predicted MAP for the k-th control loop.

The matrix C can be re-written as:

$$C = \begin{bmatrix} c11 & c12 & c13 \\ c21 & c22 & c23 \\ c31 & c32 & c33 \end{bmatrix}$$

where c11-c33 are constant values calibrated based on characteristics of the engine 102.

The model 324 may include several different sets of the A, B, and C matrices for different operating conditions. The prediction module 323 may select which set of the A, B, and C matrices to use based on, for example, engine speed, engine load, and/or one or more other parameters.

A cost module 332 determines a cost value for each of the possible sequences of the target values 230-244 based on comparisons of the predicted parameters determined for a possible sequence. An example cost determination is discussed further below. A selection module 344 selects one of the possible sequences of the target values 230-244 based on the costs of the possible sequences, respectively. For example, the selection module 344 may select the one of the possible sequences having the lowest cost while satisfying actuator constraints 348 and output constraints 352.

Satisfaction of the output constraints 352 may be considered in the cost determination. In other words, the cost module 332 may determine the cost values based on the output constraints 352. As discussed further below, based on how the cost values are determined, the selection module 344 will select the one of the possible sequences that best achieves the base torque request 308 and tracks a target engine speed trajectory 356, while satisfying the actuator constraints 348 and the output constraints 352.

The selection module 344 may set the target values 230-244 to the first ones of the N values of the selected possible sequence, respectively. In other words, the selection module 344 sets the target wastegate opening area 230 to the first one of the N values in the sequence of N values for the target wastegate opening area 230, set the target throttle opening area 232 to the first one of the N values in the sequence of N values for the target throttle opening area 232, set the target EGR opening area 234 to the first one of the N values in the sequence of N values for the target EGR opening area 234, set the target intake cam phaser angle 236 to the first one of the N values in the sequence of N values for the target intake cam phaser angle 236, and set the target exhaust cam phaser angle 238 to the first one of the N values in the sequence of N values for the target exhaust cam phaser angle 238. The selection module 344 also sets the target spark timing 240 to the first one of the N values in the sequence of N values for the target spark timing 240, the target number of cylinders 242 to the first one of the N values in the sequence of N values for the target number of cylinders 242, and the target fueling parameters 244 to the first one of the N values in the sequence of N values for the target fueling parameters 244.

During a next control loop, the MPC module 312 identifies possible sequences, generates the predicted parameters for the possible sequences, determines the cost of each of the possible sequences, selects of one of the possible sequences, and sets of the target values 230-244 to the first set of the target values 230-244 in the selected possible sequence. This process continues for each control loop.

An actuator constraint module 360 (see FIG. 2) sets the actuator constraints 348 for each of the target values 230-244. In other words, the actuator constraint module 360 sets actuator constraints for the throttle valve 112, actuator constraints for the EGR valve 170, actuator constraints for the wastegate 162, actuator constraints for the intake cam phaser 148, and actuator constraints for the exhaust cam phaser 150. The actuator constraint module 360 also sets actuator constraints for the spark actuator module 126, actuator constraints for the cylinder actuator module 120, and actuator constraints for the fuel actuator module 124.

The actuator constraints 348 for each one of the target values 230-244 may include a maximum value for an associated target value and a minimum value for that target value. The actuator constraint module 360 may generally set the actuator constraints 348 to predetermined operational ranges for the associated engine actuators. More specifically, the actuator constraint module 360 may generally set the actuator constraints 348 to predetermined operational ranges for the throttle valve 112, the EGR valve 170, the wastegate 162, the intake cam phaser 148, the exhaust cam phaser 150, the spark actuator module 126, the cylinder actuator module 120, and the fuel actuator module 124, respectively.

An output constraint module 364 (see FIG. 2) sets the output constraints 352 for the predicted torque output of the engine 102 and the predicted MAP. The output constraints 352 for each one of the predicted parameters may include a maximum value for an associated predicted parameter for each of the M future control loops and a minimum value for that predicted parameter for each of the M future control loops. For example, the output constraints 352 include M maximum torques of the engine 102 for the M future control loops, M minimum torques of the engine 102 for the M future control loops, M maximum MAPs for the M future control loops, and M minimum MAPs for the M future control loops, respectively.

The output constraint module 364 determines the output constraints 352. The output constraint module 364 determines the MAP output constraints, for example, using the relationships:

$$MAPMax_i = f(APCMax, RPM, t_i - t_0), \text{ and}$$

$$MAPMin_i = f(APCMin, RPM, t_i - t_0),$$

where $MAPMax_i$ is the maximum MAP for the i-th one of the M control loops, $MAPMin_i$ is the minimum MAP for the i-th one of the M control loops, APCMax is a maximum APC during the M control loops, APCMin is a minimum APC during the M control loops, RPM is an engine speed, $t_i$ is the time for the i-th one of the M control loops, and $t_0$ is the current time. $t_i - t_0$ corresponds to the period between the current time and the execution time for the i-th one of the M control loops. The engine speed (RPM) may be the engine speed at the current time or, in various implementations, multiple engine speeds may be used. For example, the predicted engine speeds for the M control loops may be used to determine the maximum and minimum MAPs for the M control loops, respectively. The above relationships may be embodied, for example, as equations and/or mappings (e.g., look up tables). The output constraint module 364 may determine the maximum APC and the minimum APC, for example, as functions of one or more engine speeds, such as the current engine speed and/or the predicted engine speeds for the M control loops.

The output constraint module 364 determines the torque output constraints, for example, using the relationships:

$$TMax_i = f(MAPMax_i, RPM, t_i - t_0), \text{ and}$$

$$Tmin_i = f(MAPMin_i, RPM, t_i - t_0),$$

where $TMax_i$ is the maximum torque for the i-th one of the M control loops, $TMin_i$ is the minimum torque for the i-th one of the M control loops, $MAPMax_i$ is the maximum MAP for the i-th one of the M control loops, $MAPMin_i$ is the minimum MAP for the i-th one of the M control loops, RPM is an engine speed, $t_i$ is the time for the i-th one of the M control loops, and $t_0$ is the current time. As stated above, $t_i - t_0$ corresponds to the period between the current time and the execution time for the i-th one of the M control loops. The engine speed (RPM) may be the engine speed at the current time or, in various implementations, multiple engine speeds may be used. For example, the predicted engine speeds for the M control loops may be used to determine the minimum and maximum torques for the M control loops, respectively. The above relationships may be embodied, for example, as equations and/or mappings (e.g., look up tables).

A target engine speed module 368 (see FIG. 2) generates the target engine speed trajectory 356. The target engine speed trajectory 356 includes M target engine speeds for the M future control loops, respectively. The target engine speed module 368 varies the target engine speed trajectory 356 under one or more circumstances. For example, the target engine speed module 368 may vary the target engine speed trajectory 356 for a gear shift of the transmission. The target engine speed module 368 may, for example, generate the target engine speed trajectory 356 to increase the engine speed for a downshift (e.g., third gear to second gear) of the transmission and to decrease the engine speed for an upshift (e.g., second gear to third gear) of the transmission. The transmission control module 194 may indicate upcoming gear shifts to the ECM 114.

Instead of or in addition to generating sequences of possible target values and determining the cost of each of the sequences, the MPC module 312 may identify a sequence of possible target values having the lowest cost using convex optimization techniques. For example, the MPC module 312 may determine the target values 230-244 using a quadratic programming (QP) solver, such as a Dantzig QP solver. In another example, the MPC module 312 may generate a surface of cost values for the possible sequences of the target values 230-244 and, based on the slope of the cost surface, identify a sequence of possible target values having the lowest cost. The MPC module 312 may then test that sequence of possible target values to determine whether that sequence of possible target values satisfies the actuator constraints 348. If so, the MPC module 312 may set the target values 230-244 to the first ones of the N values of that selected possible sequence, respectively, as discussed above.

If the actuator constraints 348 are not satisfied, the MPC module 312 selects another sequence of possible target values with a next lowest cost and tests that sequence of possible target values for satisfaction of the actuator constraints 348. The process of selecting a sequence and testing the sequence for satisfaction of the actuator constraints 348 may be referred to as an iteration. Multiple iterations may be performed during each control loop.

The MPC module 312 performs iterations until a sequence with the lowest cost that satisfies the actuator constraints 348 is identified. In this manner, the MPC module 312 selects the sequence of possible target values having the lowest cost while satisfying the actuator constraints 348 and the output constraints 352.

The cost module 332 may determine the cost for the possible sequences of the target values 230-244 based on relationships between: the predicted torque and the base torque request 308; and the predicted engine speeds and the target engine speeds of the target engine speed trajectory 356. The relationships may be weighted, for example, to control the effect that each of the relationships has on the cost.

For example only, the cost module 332 may determine the cost for a possible sequence of the target values 230-244 based on the following equation:

$$Cost = \sum_{i=1}^{N} \rho \epsilon^2 + \|wT*(TP-BTR)\|^2 + \|wRPM*(RPMP_i - TRPM_i)\|^2,$$

subject to the actuator constraints 348 and the output constraints 352. Cost is the cost for the possible sequence of the target values 230-244, TP is the predicted torque of the engine 102 for the next control loop, BTR is the base torque request 308 for the next control loop (i.e., i=1), and wT is a weighting value associated with the relationship between the predicted torque and the base torque request. RPMPi is the predicted RPM for the i-th one of the N control loops, TRPMi is the one of the target engine speeds for the i-th one of the N control loops, and wRPM is a weighting value associated with the relationship between the predicted engine speeds and the target engine speeds of the target engine speed trajectory 356.

ρ is a weighting value associated with satisfaction of the output constraints 352. ε is a variable that the cost module 332 may set based on whether the output constraints 352 will be satisfied. The cost module 332 may increase ε when a parameter is greater than or less than the corresponding minimum or maximum value (e.g., by at least a predetermined amount).

For example, the cost module 332 may increase E when one or more values of the predicted torque are greater than the maximum torque or less than the minimum torque for their respective control loops and/or when one or more values of the predicted MAP are greater than the maximum MAP or less than the maximum MAP for their respective control loops. In this manner, the cost for a possible sequence will increase when one or more of the output constraints 352 will not be satisfied. The cost module 332 may set ∈ to zero when all of the output constraints 352 are satisfied. ρ may be greater than the weighting value wT and the weighting value wRPM such that the cost determined for a possible sequence will be relatively large if one or more of the output constraints 352 are not satisfied. This may help to prevent the selection of a possible sequence where one or more of the output constraints 352 are not satisfied.

The cost module 332 may also vary the weighting value wRPM under some circumstances. For example, the cost module 332 may set the weighting value wRPM to a predetermined value that is greater than 0 when the target engine speed trajectory 356 is to be used, such as for gear shifts of the transmission. The cost module 332 may set the weighting value wRPM to, for example, 0 or approximately 0 when the target engine speed trajectory 356 is not to be used. When the weighting value wRPM is set to 0 or approximately zero, the relationship between the predicted engine speeds and the target engine speed trajectory 356 will not affect or will have a minimal effect on the costs.

The weighting value wT may be greater than the predetermined value of the weighting value wRPM. In this manner, the relationship between the predicted engine torque and the base torque request 308 has a larger effect on the cost (than the relationship between the predicted engine speeds and the target engine speed trajectory 356) and, therefore, the selection of one of the possible sequences. The cost increases as the difference between the predicted engine torque and the base torque request 308 increases and vice versa.

Figure 4:
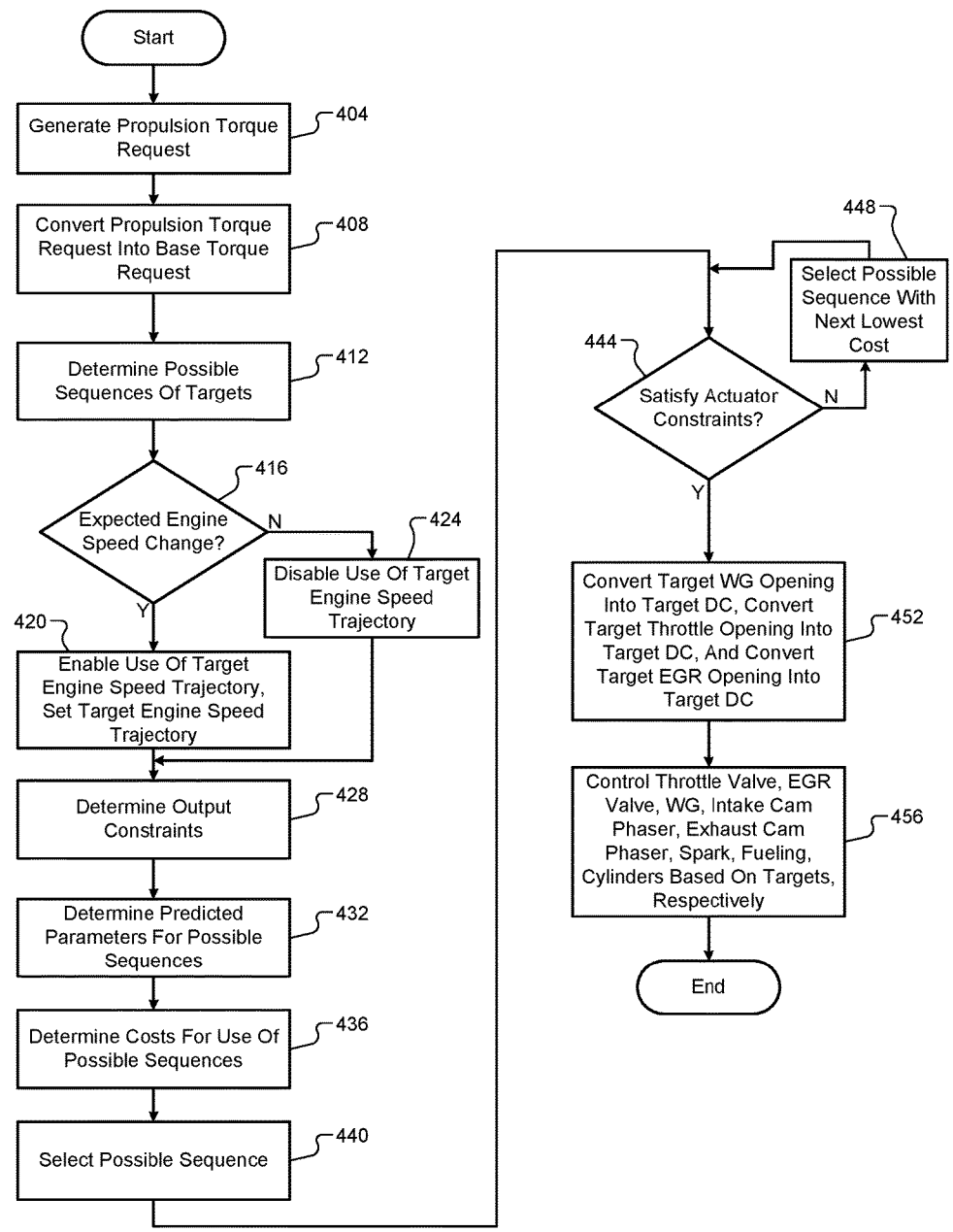
FIG. 4 is a flowchart depicting an example method of controlling a throttle valve, intake and exhaust valve phasing, a wastegate, an exhaust gas recirculation (EGR) valve, spark timing, and fueling according to the present disclosure.

FIG. 4 is a flowchart depicting an example method of controlling the throttle valve 112, the intake cam phaser 148, the exhaust cam phaser 150, the wastegate 162 (and therefore the turbocharger), the EGR valve 170, spark timing, fueling, and number of cylinders activated/deactivated. Control may begin with 404 where the torque requesting module 224 determines the propulsion torque request 218.

At 408, the torque conversion module 304 converts the propulsion torque request 218 into the base torque request 308 or into another suitable type of torque for use by the MPC module 312. The sequence determination module 316 determines possible sequences of the target values 230-244 at 412.

At 416, the cost module 332 and the target engine speed module 368 may determine whether a change in the engine speed is expected. If 416 is true, the cost module 332 may set the weighting value wRPM to the predetermined value (greater than zero) and the target engine speed module 368 may set the target engine speed trajectory 356 for the expected change at 420, and control continues with 428. The predetermined value is greater than approximately zero as to cause the relationships between the predicted engine speeds and the target engine speeds to affect the cost values. For example, the target engine speed module 368 may set the target engine speed trajectory 356 to increase the engine speed for a downshift of the transmission and may set the target engine speed trajectory 356 to decrease the engine speed for an upshift of the transmission. If 416 is false, the cost module 332 may set the weighting value wRPM to 0 or approximately 0 at 424, and control continues with 428. When the weighting value wRPM is set to 0 or approximately zero, the relationships between the predicted engine speeds and the target engine speeds of the target engine speed trajectory 356 have a minimal or no effect on the cost values.

At 428, the output constraint module 364 determines the output constraints 352. The output constraints include minimum and maximum values for the predicted torques and minimum and maximum values for the predicted MAPs. The output constraint module 364 may determine the minimum and maximum MAPs and the minimum and maximum torques, for example, using the following relationships, as described above:

$$MAPMax_i = f(APCMax, RPM, t_i - t_0),$$

$$MAPMin_i = f(APCMin, RPM, t_i - t_0),$$

$$TMax_i = f(MAPMax_i, RPM, t_i - t_0), \text{ and}$$

$$Tmin_i = f(MAPMin_i, RPM, t_i - t_0).$$

The actuator constraint module 360 may also determine the actuator constraints 348 at 428.

At 432, the prediction module 323 determines the predicted parameters for each of the possible sequences of target values. The prediction module 323 determines the predicted parameters for the possible sequences based on the model 324 of the engine 102. More specifically, based on a possible sequence of the target values 230-244, using the model 324, the prediction module 323 generates a sequence of M predicted torques of the engine 102 for the M control loops, a sequence of M predicted engine speeds for the M control loops, and a sequence of M predicted MAPs for the M control loops.

The cost module 332 determines the costs for the possible sequences, respectively, at 436. For example only, the cost module 332 may determine the cost for a possible sequence of the target values 230-244 based on the equation:

$$Cost = \sum_{i=1}^{N} \rho \epsilon^2 + \|wT^*(TP - BTR)\|^2 + \|wRPM^*(RPMP_i - TRPM_i)\|^2,$$

subject to the actuator constraints 348 and the output constraints 352, as discussed above. As also discussed above, the term involving comparing the predicted engine speeds with the target engine speeds of the target engine speed trajectory 356 may be approximately zero when the engine speed is not expected to change.

The selection module 344 selects one of the possible sequences of the target values 230-244 based on the costs of the possible sequences, respectively, at 440. For example, the selection module 344 may select the one of the possible sequences having the lowest cost. The selection module 344 may therefore select the one of the possible sequences that best achieves the base torque request 308 while as closely as possible tracking the target engine speed trajectory 356 and satisfying the output constraints 352.

The MPC module 312 may determine whether the selected one of the possible sequences satisfies the actuator constraints 348 at 444. If 444 is true, control may continue with 452. If 444 is false, the MPC module 312 may select another one of the possible sequences with the next lowest cost at 448, and control may return to 444. In this manner, the sequence with the lowest cost that satisfies the actuator constraints 348 will be used.

At 452, the first conversion module 248 converts the target wastegate opening area 230 into the target duty cycle 250 to be applied to the wastegate 162, the second conversion module 252 converts the target throttle opening area 232 into the target duty cycle 254 to be applied to the throttle valve 112. The third conversion module 256 also converts the target EGR opening area 234 into the target duty cycle 258 to be applied to the EGR valve 170 at 452. The fourth conversion module may also convert the target intake and exhaust cam phaser angles 236 and 238 into the target intake and exhaust duty cycles to be applied to the intake and exhaust cam phasers 148 and 150, respectively. If a value other than spark timing is determined, such as a target torque decrease or a target combustion phasing, the spark timing may be determined based on that value at 452.

At 456, the throttle actuator module 116 controls the throttle valve 112 to achieve the target throttle opening area 232, and the phaser actuator module 158 controls the intake and exhaust cam phasers 148 and 150 to achieve the target intake and exhaust cam phaser angles 236 and 238, respectively. For example, the throttle actuator module 116 may apply a signal to the throttle valve 112 at the target duty cycle 254 to achieve the target throttle opening area 232.

Also at 456, the EGR actuator module 172 controls the EGR valve 170 to achieve the target EGR opening area 234, and the boost actuator module 164 controls the wastegate 162 to achieve the target wastegate opening area 230. For example, the EGR actuator module 172 may apply a signal to the EGR valve 170 at the target duty cycle 258 to achieve the target EGR opening area 234, and the boost actuator module 164 may apply a signal to the wastegate 162 at the target duty cycle 250 to achieve the target wastegate opening area 230. Also at 456, the spark actuator module 126 controls the spark timing based on the target spark timing 240, the cylinder actuator module 120 controls cylinder activation and deactivation based on the target number of cylinders 242, and the fuel actuator module 124 controls fueling based on the target fueling parameters 244. While FIG. 4 is shown as ending after 456, FIG. 4 may be illustrative of one control loop, and control loops may be executed at a predetermined rate. Also, the order of operations provided and discussed with FIG. 4 are an example and operations may be performed in a different order.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An engine control system of a vehicle, comprising:
a target engine speed circuit that selectively sets M target engine speeds for M future times, respectively, based on one of increasing and decreasing an engine speed, wherein M is an integer greater than one;
a prediction circuit that, based on a set of possible target values for the M future times and a model of an engine, determines M predicted engine speeds for the M future times, respectively;
a cost circuit that determines a cost for the set of possible target values based on comparisons of the M predicted engine speeds for the M future times with the M target engine speeds for the M future times, respectively;
a selection circuit that, based on the cost, selects the set of possible target values from a group including the set of possible target values and N other sets of possible target values, wherein N is an integer greater than zero, and that sets target values based on the selected set of possible target values; and
an actuator circuit that controls an engine actuator based on a first one of the target values.

2. The engine control system of claim 1 wherein:
based on the set of possible target values and the model of the engine, the prediction circuit further determines M predicted intake manifold pressures for the M future times, respectively; and
the cost circuit determines the cost for the set of possible target values further based on comparisons of the M predicted intake manifold pressures with M intake manifold pressure ranges for the M future times, respectively.

3. The engine control system of claim 2 further comprising a constraint circuit that determines the M intake manifold pressure ranges for the M future times based on minimum and maximum air per cylinders (APCs) of the engine and at least one engine speed.

4. The engine control system of claim 1 wherein:
based on the set of possible target values and the model of the engine, the prediction circuit further determines M predicted torque outputs of the engine for the M future times, respectively; and
the cost circuit determines the cost for the set of possible target values further based on comparisons of the M predicted torques with M engine torque output ranges for the M future times, respectively.

5. The engine control system of claim 4 further comprising a constraint circuit that determines the M engine torque output ranges for the M future times based on M intake manifold pressure ranges for the M future times, respectively, and at least one engine speed.

6. The engine control system of claim 5 wherein:
based on the set of possible target values and the model of the engine, the prediction circuit further determines M predicted intake manifold pressures for the M future times, respectively; and
the cost circuit determines the cost for the set of possible target values further based on comparisons of the M predicted intake manifold pressures with the M intake manifold pressure ranges for the M future times, respectively.

7. The engine control system of claim 1 wherein the target engine speed circuit sets the M target engine speeds for the M future times, respectively, based on increasing the engine speed for a downshift of a transmission.

8. The engine control system of claim 1 wherein the target engine speed circuit sets the M target engine speeds for the M future times, respectively, based on decreasing the engine speed for an upshift of a transmission.

9. The engine control system of claim 1 wherein the selection circuit selects the set of possible target values from the group based on the cost being less than costs of the N other sets of possible target values, respectively.

10. The engine control system of claim 1 further comprising:
a boost actuator circuit that controls opening of a wastegate of a turbocharger based on a second one of the target values;
an exhaust gas recirculation (EGR) actuator circuit that controls opening of an EGR valve based on a third one of the target values;
a phaser actuator circuit that controls intake and exhaust valve phasing based on fourth and fifth ones of the target values, respectively;
a spark actuator circuit that controls spark timing based on a sixth one of the target values; and
a fuel actuator circuit that controls fueling based on a seventh one of the target values,
wherein the actuator circuit controls the opening of a throttle valve based on the one of the target values.

11. An engine control method for a vehicle, comprising:
selectively setting M target engine speeds for M future times, respectively, based on one of increasing and decreasing an engine speed,
wherein M is an integer greater than one;
based on a set of possible target values for the M future times and a model of an engine, determining M predicted engine speeds for the M future times, respectively;
determining a cost for the set of possible target values based on comparisons of the M predicted engine speeds for the M future times with the M target engine speeds for the M future times, respectively;
based on the cost, selecting the set of possible target values from a group including the set of possible target values and N other sets of possible target values, wherein N is an integer greater than zero;
setting target values based on the selected set of possible target values; and
controlling an engine actuator based on a first one of the target values.

12. The engine control method of claim 11 further comprising:
based on the set of possible target values and the model of the engine, determining M predicted intake manifold pressures for the M future times, respectively; and
determining the cost for the set of possible target values further based on comparisons of the M predicted intake manifold pressures with M intake manifold pressure ranges for the M future times, respectively.

13. The engine control method of claim 12 further comprising determining the M intake manifold pressure ranges for the M future times based on minimum and maximum air per cylinders (APCs) of the engine and at least one engine speed.

14. The engine control method of claim 11 further comprising:
based on the set of possible target values and the model of the engine, determining M predicted torque outputs of the engine for the M future times, respectively; and
determining the cost for the set of possible target values further based on comparisons of the M predicted torques with M engine torque output ranges for the M future times, respectively.

15. The engine control method of claim 14 further comprising determining the M engine torque output ranges for the M future times based on M intake manifold pressure ranges for the M future times, respectively, and at least one engine speed.

16. The engine control method of claim 15 further comprising:
based on the set of possible target values and the model of the engine, determining M predicted intake manifold pressures for the M future times, respectively; and
determining the cost for the set of possible target values further based on comparisons of the M predicted intake manifold pressures with the M intake manifold pressure ranges for the M future times, respectively.

17. The engine control method of claim 11 further comprising setting the M target engine speeds for the M future times, respectively, based on increasing the engine speed for a downshift of a transmission.

18. The engine control method of claim 11 further comprising setting the M target engine speeds for the M future times, respectively, based on decreasing the engine speed for an upshift of a transmission.

19. The engine control method of claim 11 further comprising selecting the set of possible target values from the group based on the cost being less than costs of the N other sets of possible target values, respectively.

20. The engine control method of claim 11 further comprising:
controlling opening of a wastegate of a turbocharger based on a second one of the target values;
controlling opening of an exhaust gas recirculation (EGR) valve based on a third one of the target values;
controlling intake and exhaust valve phasing based on fourth and fifth ones of the target values, respectively;
controlling spark timing based on a sixth one of the target values; and controlling fueling based on a seventh one of the target values,
wherein controlling the engine actuator based on the first one of the target values includes controlling opening of a throttle valve based on the first one of the target values.

* * * * *